United States Patent [19]

Monteyne

[11] Patent Number: 4,493,767
[45] Date of Patent: Jan. 15, 1985

[54] CONVEYOR BELT FOR TRANSPORTING SLAG MATERIAL FROM A FILTERING APPARATUS

[76] Inventor: Guido Monteyne, Beukenlaan 28, 9971 Lembeke, Belgium

[21] Appl. No.: 578,818

[22] Filed: Feb. 10, 1984

[30] Foreign Application Priority Data

Apr. 28, 1983 [LU] Luxembourg .................. 84782

[51] Int. Cl.³ .............................................. B01D 33/06
[52] U.S. Cl. ...................................... 210/236; 210/241;
210/297; 210/394; 210/402; 193/10; 193/17;
193/30; 198/632; 198/864; 209/257; 209/284
[58] Field of Search .................. 209/257, 284, 371;
193/10, 15, 17, 30; 198/632, 812, 864; 210/217,
232, 236, 297, 307, 372, 374, 375, 394, 241, 402,
403, 404

[56] References Cited

U.S. PATENT DOCUMENTS

| 225,344 | 3/1880 | Clark | 198/632 |
|---|---|---|---|
| 891,355 | 1/1908 | Mitchell | 193/17 |
| 2,758,722 | 8/1956 | Murray | 209/284 |
| 3,815,482 | 6/1974 | Nelson | 198/864 |
| 3,825,107 | 7/1974 | Cary | 198/812 |
| 3,962,092 | 6/1976 | Newman | 210/236 |
| 4,172,035 | 10/1979 | Adams | 210/400 |
| 4,204,855 | 5/1980 | Monteyne | 210/394 |
| 4,252,055 | 2/1981 | Johansson | 198/864 |
| 4,289,519 | 9/1981 | Monteyne | 210/394 |

Primary Examiner—Ernest G. Therkorn
Attorney, Agent, or Firm—Fishman & Dionne

[57] ABSTRACT

A conveyor belt assembly is presented for use in conjunction with a rotary drum filtration apparatus, the conveyor belt passing longitudinally through the drum. The conveyor belt assembly comprises two movable frame sections and an associated conveyor belt. A first movable frame section is slidably mounted, preferably by rollers on rails, on the supporting framework whereby the conveyor belt may be moved between an operative position inside the drum and a retracted position outside the drum. The second movable frame section is pivotably mounted and is capable of pivoting upwardly into a raised position thereby providing a space for the first frame section to be slidably positioned thereunder. Preferably, a ramp means attached to the slidable frame section urges the second pivotable frame section upwardly to the raised position.

11 Claims, 3 Drawing Figures

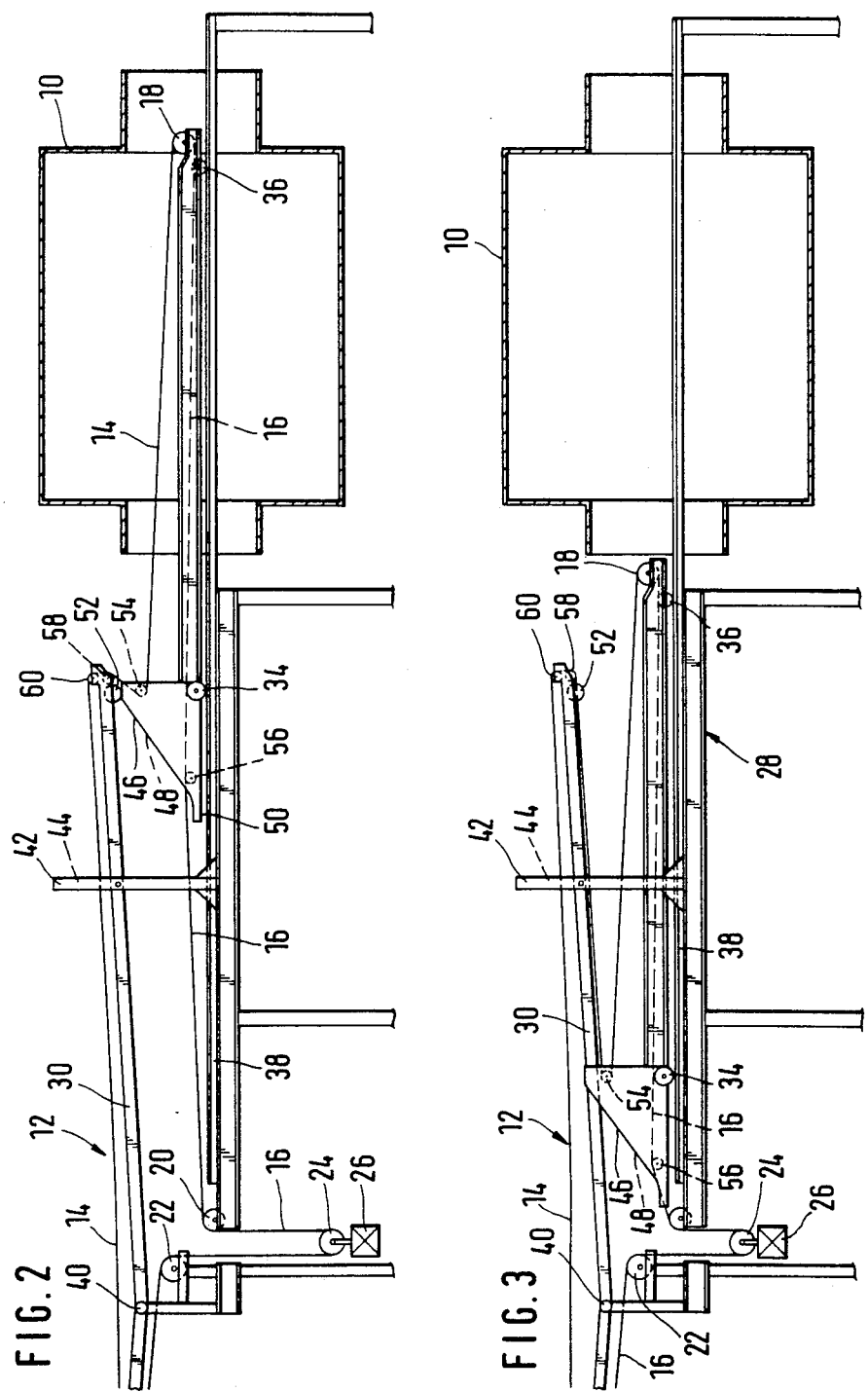

4,493,767

CONVEYOR BELT FOR TRANSPORTING SLAG MATERIAL FROM A FILTERING APPARATUS

BACKGROUND OF THE INVENTION

This invention relates to apparatus for transporting granulated slag and the like. More particularly, this invention relates to a new and improved conveyor belt for conveying granulated slag and the like, particularly blast furnace slag, from a metallurgical slag filtering apparatus. The conveyor belt of the present invention comprises, in part, two movable sections mounted on a rigid frame.

The general type of filtering apparatus to which this invention is directed is disclosed in my earlier U.S. Pat. No. 4,204,855, of which all of the disclosure is incorporated herein by reference. This invention presents an improved conveyor belt system particularly suitable for that filtration system, but not limited thereto. Other improved features and details of the filtering apparatus described in U.S. Pat. No. 4,204,855 are disclosed in copending U.S. patent application Ser. Nos. 578,816 and 578,817 being filed simultaneously herewith, all of the contents of which are incorporated herein by reference thereto.

The filtration apparatus of U.S. Pat. No. 4,204,855 generally comprises a substantially horizontal rotary drum having filtering screens or foraminous walls along the outside surface thereof and being provided with internal vanes along the inside surface thereof for conveying metallurgical slag upwardly. Thereafter, the filtered slag falls freely onto a conveyor belt passing longitudinally through the drum. A filtering apparatus of this type will also include a feed channel through which the pulp, i.e., granulated slag and water, is fed onto the drum.

In order to have improved accessability to both the conveyor belt and the interior of the rotary drum, particularly for maintenance, it would be advantageous to provide an improved conveyor belt which can be easily removed from the interior of the rotary drum.

SUMMARY OF THE INVENTION

In accordance with the present invention, a novel conveyor belt and associated belt assembly is provided in which the conveyor belt is mounted on two movable frame sections. A first movable frame section, located substantially within the rotary drum, is supported by rollers on rails of a fixed frame section thereby permitting a relative sliding motion between the first movable frame section and the fixed frame. Thus, the sliding first frame section enables the conveyor belt to easily move between an operative position inside the drum and a retracted position outside the drum. The second movable frame section is located outside the drum and is pivotally mounted on a shaft, the shaft being attached to the fixed supporting frame section and being perpendicular to the direction of movement of the first movable frame section.

In a preferred embodiment, the pivotal second section of the frame is associated with two vertical posts whereby said pivotal section may be retained or supported in a raised position.

The sliding first frame section comprises two inclined side ramps which are located at the end of the sliding frame section which is not within the rotary drum. These ramps support two corresponding rollers located on the free end of the pivotal first frame section such that, by retracting the sliding frame section out of the rotary drum, the pivotal frame section will be raised upwardly. The raising of the pivotal section is effected by the travel of the rollers along the inclined ramps. The sliding frame section enters into the space made available underneath the pivotal section during the raising thereof.

Preferably, the lower portion of each inclined ramp has a flat extension member which serves as a support for the rollers of the pivotal frame section when conveyor belt mechanism of the present invention is in an operating position.

A tension means, such as a tension roller associated with a weight, is provided in order to keep the conveyor belt stressed while retracting the sliding frame section from the interior of the rotary drum.

In a preferred embodiment of the present invention, a return roller is provided between the two ramps so that during the above discussed retraction of the sliding frame section, the upper conveyor belt will double back into position underneath the pivotal frame section.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures.

FIG. 2 is a side elevation view, partly in cross section, of a conveyor belt assembly of FIG. 1 during an early stage of removing the sliding frame section from the rotary drum.

FIG. 3 is side elevation view, partly in cross section, of the conveyor belt assembly of FIG. 1 after the sliding frame section has been completely retracted from the rotary drum and positioned within the space provided underneath the raised pivotal frame section.

DESCRIPTION OF THE PREFERRED EMBODIMENT

Figure 1:
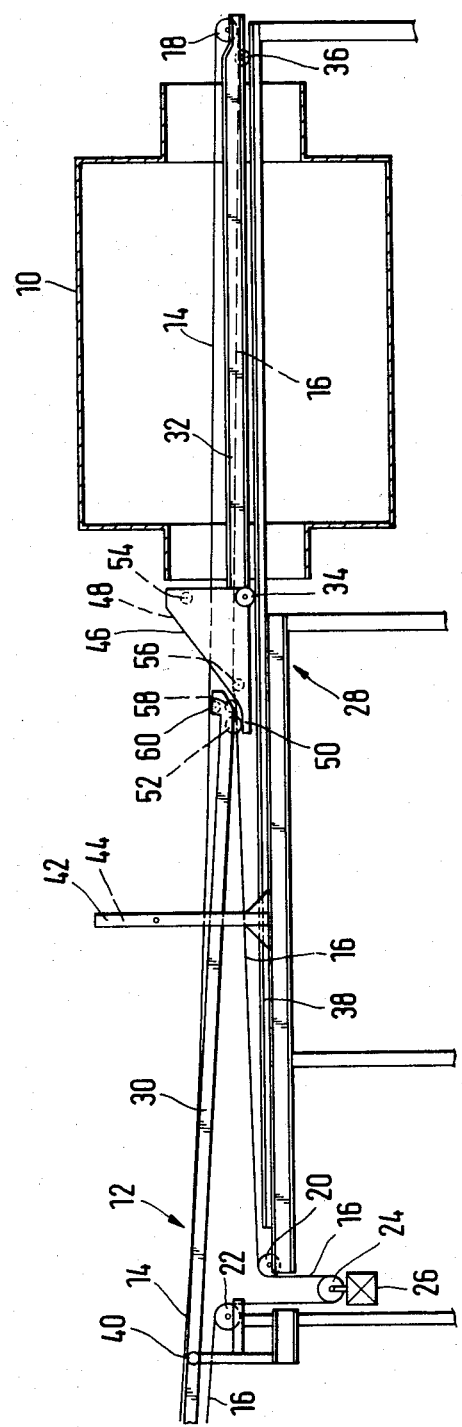
FIG. 1 is a side elevation view, partly in cross section, of a conveyor belt assembly in an operative position within a rotary drum in accordance with the present invention.

Referring first to FIG. 1, a rotary filtration drum of the type described in U.S. Pat. No. 4,204,855 and an improved version of which are further described in U.S. patent application Ser. Nos. 578,816 and 578,817 being filed herewith is shown generally at 10. Discharge of the granulated slag material from rotary drum 10 is effected by means of a conveyor belt shown generally at 12. Conveyor belt 12 which is continuous and only a portion of which is shown in the drawings, comprises an upper outgoing (i.e. exiting) belt section 14 and a lower incoming (i.e. entering) belt section 16, which are associated with rollers 18, 20 and 22. In a preferred embodiment, the conveyor belt 12 also has provided therewith a tension roller 24 associated with a weight 26. Of course, any other suitable belt tensioning means may also be utilized herein.

The conveyor belt 12 and associated rollers 18, 20 and 22 are mounted in a suitable frame which includes a fixed or rigid supporting framework unit at 28. This framework preferably consisting of conventional metal support members. An important feature of the present invention includes two independent and movable frame sections mounted on fixed framework 28. These two independent sections include a first slidable frame section 32 and a second pivotal frame section 30.

First frame section 32 is located substantially within the rotary drum 10 during operation of the filtering apparatus. Slidable frame section 32 is supported by two pairs of rollers 34 and 36 which are mounted on and move over with a pair of rails 38; rails 38 being intregal with the framework 28. Accordingly, the rollers 34,36 and associated rails 38 impart a relative sliding motion between the first section 32 and the framework 28.

The second frame section 30 is pivotable about a horizontal shaft 40 located on the framework 28. Two posts 42 and 44 are located on either side of pivotal frame section 30. Posts 42 and 44 are intregal with framework 28 and are capable of supporting the pivotable frame section 30 when it is pivoted or raised upwardly into the raised position shown in FIGS. 2 and 3. Retaining means such as a rod or the like placed through the two vertical posts 42 and 44 may be used to support the pivotable frame section 30 in an upright position.

The portion of slidable frame section 32 which is not positioned within the drum 10 during operation (the left end in FIG. 1) has inclined ramps 46 and 48 on opposite sides thereof. (note that ramp 48 is behind 46 and thus not shown in the FIGURES) Ramps 46 and 48 act to raise the pivotable frame section 30 during the removal of the sliding frame section 32 from the rotary drum 10. The lower portion of each inclined ramp 46 and 48 has a flat extension member 50 which serves as a support for a pair of rollers 52 at the left end of the pivotable frame section 30.

The conveyor belt assembly of the present invention also includes a pair of return rollers 54 and 56 which are positioned between the ramps 46 and 48 and a pair of return rollers 58 and 60 which are positioned at the end of the pivotable frame section 30 nearest the rotary drum 10.

The process of slidably removing slidable frame section 32 from within the rotary drum 10 is illustrated in FIGS. 1, 2 and 3. In FIG. 1, the conveyor belt assembly of the present invention is shown in an operative position (i.e., slidable frame section 32 is positioned within rotary drum 10). In order to remove the slidable frame section 32 from within the rotary drum 10, the frame section 32 will be moved toward the left (as viewed relative to FIG. 1) thereby raising the pivotable frame section 30 by the interaction of rollers 52 and ramps 46,48. It will be understood that slidable frame section 32 may be moved by any suitable method, i.e., a cable and winch (not shown in the drawings). The raising of the pivotable frame section 30 results from the action of the ramps 46 and 48 which cause the pair of rollers 52 to move upwardly along the ramps to the maximum height indicated in FIG. 2. At this point, the pivotable frame section 30 may be retained in the raised position by any suitable means such as a rod or the like (not shown) inserted across and through the vertical posts 42 and 44. It should be understood that a rod placed between the two vertical posts 42 and 44 could be replaced by two spring mounted tilting wedges or the like which would automatically provide support for the pivotable frame section 30 when it reached the upward position shown in FIG. 2.

After the pivotable frame section 30 has been supported by the two vertical posts 42 and 44, the ramps 46 and 48 may be moved further to the left, via the rollers 34,36 and rails 38, with the ramps 46,48 being disengaged from rollers 52. As the ramps 46,48 are moved to the left along the rails 38, the slidable frame section 32 will be withdrawn from the inside of the rotary drum 10 and positioned underneath the raised pivotable frame section 30 as shown in FIG. 3.

It should be understood that simultaneous with the move of the ramps 46,48 toward the left, the roller 54 located between the two ramps 46,48 will engage the upper belt 14 and move it into position underneath the raised pivotable frame section 30. This is an important and preferrable feature of the present invention as the roller 54 will act to balance out the reduction in the total length of the conveyor belt 12. It will be understood that in the absence of the return roller 54, the translatory motion of the sliding frame section 32 would have to be absorbed by a relatively long descent of the tension roller 24.

The rollers 58 and 60 provide guidance for the belt about the free end of the pivotable frame section 30 during the movement of the belt between the positions shown in FIG. 2 and FIG. 3.

The rollers 56 located between ramps 46 and 48 will function to hold the lower side 16 of the conveyor belt in position during the translatory movement of the sliding frame section 32. These rollers 56 are particularly important when the slidable frame section reaches the end of its travel and comes to rest in the position shown in FIG. 3.

The conveyor belt assembly of the present invention may be easily removed from the interior of the rotary drum. This easy removal feature provides improved and important accessibility to both the conveyor belt and the interior of the rotary drum, particularly during maintenance operations.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A conveyor belt assembly used in conjunction with a rotary drum filtration apparatus, said conveyor belt assembly passing longitudinally through the drum, said conveyor belt assembly comprising:
   fixed supporting framework means associated with a conveyor belt;
   a first movable frame section having said conveyor belt thereon and being slidably mounted on said supporting framework means whereby said conveyor belt may be moved between an operative position inside said drum and a retracted position outside said drum; and
   a second movable frame section having said conveyor belt thereon and being pivotably mounted on said supporting framework means, said second frame section capable of being pivoted upwardly into a raised position thereby providing a space for said first frame section to be slidably positioned thereunder.

2. The assembly of claim 1 including:
   ramp means attached to said first frame section; and
   first roller means rotably attached to said second frame section, said first roller means contacting said ramp means whereby said first roller means moves upwardly along said ramp means as said first frame section slidably retracts from said drum thereby pivoting said second frame section in a raised position.

3. The assembly of claim 2 including:
extension means being attached to said ramp means, said extension means providing support to said first roller means when said first frame section is in an operative position.

4. The assembly of claim 2 wherein said first frame section includes:
second roller means; and
said supporting framework means includes rail means, said second roller means associated with said rail means whereby slidable motion between said framework means and said first frame section is effected.

5. The assembly of claim 4 including:
extension means being attached to said ramp means, said extension means providing support to said first roller means when said first frame section is in an operative position.

6. The assembly of claim 2 including:
return roller means attached to said ramp means whereby said conveyor belt will be doubled backed underneath said second frame section during retraction of said first frame section.

7. The assembly of claim 1 wherein said first frame section includes:
second roller means; and
said supporting framework means includes rail means, said second roller means associated with said rail means whereby slidable motion between said framework means and said first frame section is effected.

8. The assembly of claim 1 including:
means for retaining said second frame section in a raised position.

9. The assembly of claim 8 wherein:
said retaining means includes a pair of vertical posts extending from said framework means and associated with a substantially horizontal retaining rod.

10. The assembly of claim 1 including:
means for tensioning said conveyor belt whereby said belt is stressed when retracting said first frame section from said drum.

11. The assembly of claim 10 wherein:
said tensioning means includes a tensioning roller associated with a weight.

* * * * *